United States Patent [19]

Schwierz

[11] Patent Number: 4,763,324

[45] Date of Patent: Aug. 9, 1988

[54] FRAME DECODING

[75] Inventor: Theodor Schwierz, Aichach, Fed. Rep. of Germany

[73] Assignee: Siemens Aktiengesellschaft, Berlin and Munich, Fed. Rep. of Germany

[21] Appl. No.: 13,066

[22] Filed: Feb. 10, 1987

[30] Foreign Application Priority Data

Feb. 10, 1986 [DE] Fed. Rep. of Germany ....... 3604183

[51] Int. Cl.$^4$ .......................... H04J 3/06; H04L 7/08
[52] U.S. Cl. ...................................... 370/100; 375/116
[58] Field of Search ................ 370/100; 375/106, 111, 375/116

[56] References Cited

U.S. PATENT DOCUMENTS 3,920,900 11/1975 Fineman .............................. 370/100

*Primary Examiner*—Robert L. Griffin
*Assistant Examiner*—Marianne Huseman
*Attorney, Agent, or Firm*—Hill, Van Santen, Steadman & Simpson

[57] ABSTRACT

A method of frame decoding a series data flow having a frame structure containing an item of periodically occurring synchronizing information, employs a frame recognition circuit, which is synchronized to the item of synchronizing information and is coupled to a frame generator. After a predetermined number of synchronous coincidences of the item of synchronizing information and a synchronizing signal emitted from the frame generator, the frame recognition circuit and frame generator are decoupled. During synchronous coincidence, a weighting counter is periodically increased by a predetermined amount, and in the case of non-coincidence it is periodically reduced by a predetermined amount. Resynchronization takes place only when the count of the weighting counter has reached its maximum value and the frame recognition circuit is synchronized to a new item of synchronizing information.

3 Claims, 1 Drawing Sheet

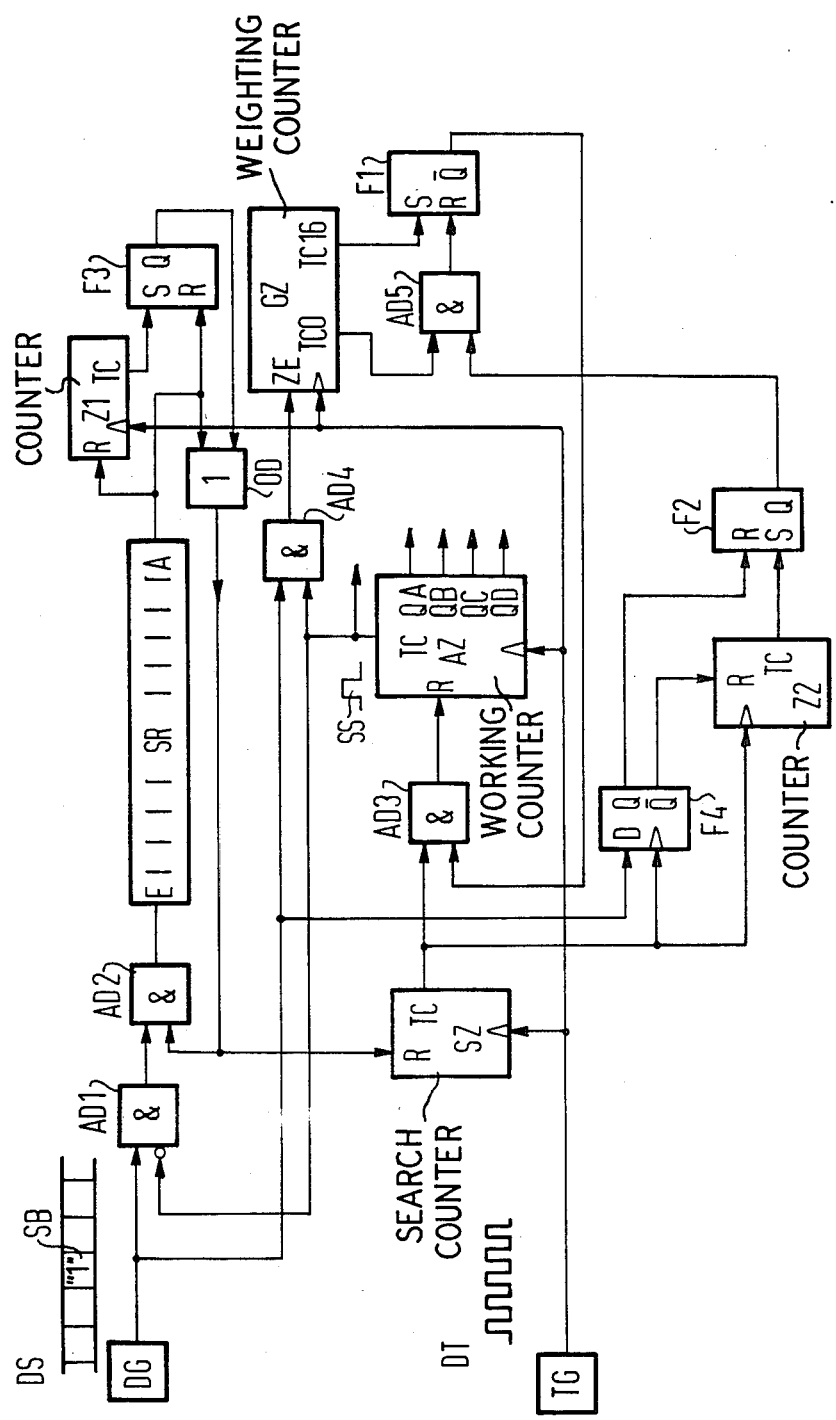

FRAME DECODING

BACKGROUND OF THE INVENTION

The invention relates to a method of frame decoding as and more particularly to such a method used in a signal transmission system having a frame structure with periodically occurring synchronizing information which marks the start of each frame.

Digital signal devices are being used to an increasing extent in transmission technology, in particular over radio relay links. For the additional transmission of information bits for service channel purposes and message purposes, such devices require a multiplexer-demultiplexer system with a so-called super-frame structure.

The publication "Multiplexers for 8.448 Mbit/s in Positive-Negative Stuffing Technology" by U. Assmus and others (see communication from the Research Institute of the FTZ of the German Post Office in Darmstadt, published in "Nachrichtentechnische Fachberichte" 42 (1972), page 245-256) states the following. The combination of a plurality of PCM basic systems to form a system of the second order for the more efficient transmission of digital signals over long distances will represent an effective preliminary stage of a digital network and can be fulfilled by multiplexers without transmission losses. As a synchronous digital network cannot be expected to exist in the near future, asynchronous multiplexers should be of significance for a long transition period. Amongst asynchronous multiplexers, the multiplexer featuring "positive-negative" stuffing technology appears to be of special significance. In the receiving component of the multiplexer-demultiplexer system. synchronism between transmitter and receiver is established in a synchronizing device. For this purpose, in a generally conventional manner, a periodically recurring synchronizing word is transmitted in the bit flow. The synchronizing word provides the bit flow with a frame structure, where the start of the frame is marked by the synchronizing word.

As stated in the description of the Siemens digital signal multiplex device DSMX8/34, a frame codeword consisting of 10 bits is used at the start of the pulse frame. In the frame synchronizing circuit a shift register is shifted relative to the bit flow until, via a logic-linking device, a frame codeword is recognized at the outputs of the shift register.

SUMMARY OF THE INVENTION

The aim of the invention is, in a digital radio relay device, to provide a method of frame decoding which, even when so-called cluster disturbances occur on the transmission link, facilitates a rapid and reliable synchronization of the receiving device and maintains a synchronous coincidence once it has been recognized.

This aim is fulfilled in accordance with the invention by apparatus incorporating a frame recognition circuit, a frame generator and a weighting counter, the frame generator being connected to the frame recognition circuit for producing a synchronizing signal which is continuously checked with received data to verify synchronization, the state of the weighting counter being charged in response to synchronous or asynchronous operation, and the frame generator being coupled or decoupled from the frame recognition circuit in dependance on the state of the counter reaching a predetermined minimum or maximum value, respectively.

Cyclic pulse disturbances can result in total breakdowns of entire network components. In postal networks the effects of such disturbances are not so serious as resynchronization is achieved in approximately 1-2 ms. In the case of enciphered transmission, on the other hand, resynchronization of the cipher devices takes approximately 50-100 ms.

The method in accordance with the invention serves to improve the level of freedom from disturbances since the synchronizing information is uniformly distributed over the bit flow.

Because the circuit arrangement corresponding to the invention does not generate a new synchronizing signal during the search procedure and/or the absence of the synchronizing bit, whereas in fact the new synchronizing signal is emitted only after a predetermined number of correctly recognized synchronizing bits, the level of freedom from mis-synchronization is improved. During the search procedure, in particular in the presence of disturbances, once the synchronizing signal has been produced it continues to be emitted unchanged.

BRIEF DESCRIPTION OF THE DRAWINGS

In the following the invention will be described in detail making reference to an exemplary embodiment which is illustrated in the sole drawing, showing a circuit arrangement for the implementation of the method corresponding to the invention.

In the drawing, a data source DG and a clock generator TG form part of the receiving-end demultiplexer device. The data source DG emits a binary data flow DS which contains a periodically recurring synchronizing bit SB. The data flow DS has a frame structure which is marked by the logic ones of the synchronizing bit SB. The clock generator TG emits a data clock signal DT, whose rising flanks occur for example in the middle of the bits of the data flow DS.

The data flow DS, emitted from the data source DG, is applied to the first input of a first AND-gate AD1. The output of the first AND-gate AD1 is connected to the first input of a second AND-gate AD2, whose output is connected to an input E of a shift register SR. An output A of the shift register SR is connected to the first input of an OR-gate OD and to the reset inputs R of a first counter Z1 and a third RS flip-flop F3. The output of the OR-gate OD, whose other input is connected to an output Q of the third RS flip-flop, is connected to the other input of the second AND-gate AD2. A carry output TC of the counter Z1 is connected to a set input S of the third RS flip-flop F3.

The output A of the shift register SR is also connected via the OR-gate OD to a reset input R of a frame recognition circuit which is formed by a so-called search counter SZ. A carry output TC of the search counter SZ is connected to the first input of a third AND-gate AD3, to a clock input of a D flip-flop F4, and to a clock input of a further counter Z2. The output of the third AND-gate AD3 is connected to a reset input R of a frame generator which consists of a so-called working counter AZ. The working counter AZ is provided in known manner with outputs QA to QD, from which undesignated clock pulse sequences are emitted. A carry output TC of the working counter AZ emits a synchronizing signal SS which is applied to the other inverting input of the first AND-gate AD1 and to the other input of a fourth AND-gate AD4. The data flow is supplied to the first input of the fourth AND-gate AD4 and the input D of the D flip-flop F4.

The output of the fourth AND-gate AD4 is connected to a counting direction input ZE of a weighting counter GZ. The data clock signal DT, emitted from the clock generator TG, occurs at the clock inputs of the weighting counter GZ, the counter Z1, the working counter AZ and the search counter SZ. The weighting counter GZ has a minimum carry output TCO and a maximum carry output TC16. A logic "1" is emitted from the minimum carry output TCO when the count of the weighting counter GZ has reached the value of zero. A logic "1" is emitted from the maximum carry output TC16 when the count of the weighting counter GZ has reached, for example, the value of 16. The count of the weighting counter GZ cannot be smaller than the value of zero and cannot be greater than the value of 16.

The minimum carry output TCO of the weighting counter GZ is connected to the first input of a fifth AND-gate AD5, and the maximum carry output TC16 is connected to a set input S of a first RS flip-flop F1. The output of the fifth AND-gate AD5 is connected to a reset input R of the first RS flip-flop F1. An inverting output $\overline{Q}$ of the first RS flip-flop F1 is connected to the other input of the third AND-gate AD3.

An output Q of the D flip-flop F4 is connected to a reset input R of a second RS flip-flop F2, whose output Q is connected to the other input of the fifth AND-gate AD5. An inverting output $\overline{Q}$ of the D flip-flop F4 is connected to a reset input R of the further counter Z2, whose carry output TC is connected to a set input S of the second RS flip-flip F2.

The fundamental mode of operation of the method corresponding to the invention will be described in the following.

The search counter SZ is synchronized to the synchronizing bit SB in the data flow DS.

After a predetermined number of correctly recognized synchronizing bits SB, the working counter AZ receives the count of the search counter SZ. The working counter AZ emits the synchronizing signal SS and sub-clock signals, in synchronism therewith, for the receiving section of the demultiplexer. The synchronizing signal SS is continously checked to established whether it is in synchronism with the synchronizing bit SB in the data flow. The synchronizing signal SS is emitted even if this synchronizing bit SB is adulterated as a result of disturbances. Resynchronization takes place only if on the one hand it is established several times that the synchronizing signal SS is not in synchronism with the synchronizing bit SB and on the other hand it is established several times that the search counter SZ is in synchronism with "another" synchronizing bit SB.

The mode of operation of the circuit arrangement illustrated in the figure will be explained in the following.

It will be assumed that a state of initial synchronization exists, in which the data flow DS, emitted from the data source DG, is fed via the first and second AND-gates AD1, AD2 to the input E of the shift register SR. The shift register SR contains the same number of bit locations as the bits contained in a frame. The number of bit locations and of bits contained in the frame can vary for example between 68 and 1080.

In the second AND-gate AD2 a AND-logic link takes place between a bit in the data flow DS and the bit emitted from the output A of the shift register SR. This bit is transferred via the OR-gate OD to the other input of the second AND-gate AD2. The two logic-linked bits each occupy the same bit locations in their frames. If, for example, the synchronizing bit S is located at the bit location bearing number 1, the AND logic-link is always carried out with the synchronizing bit SB emitted from the output A of the shift register SR and the synchronizing bit SB currently obtained from the data flow DS.

The synchronizing bit SB is marked, for example, by a logic "1". Via the second AND-gate AD2 it is thus ensured that, unless it has been adulterated in the data flow DS, the logic "1" which is assigned to the synchronizing bit SB passes through the shift register SR. All the other bits in the frame are not permanently set at logic "1", so that during the course of time their bit locations are overwritten by a logic "0".

The search counter SZ is always set at zero by the logic ones emitted from the output A of the shift register SR. A logic "1" is emitted from the carry output TC of the search counter SZ when the count of the search counter SZ has reached its maximum value. This maximum value corresponds to the number of bits in the frame and thus varies, for example, between 68 and 1080. Thus, the count of the search counter SZ reaches its maximum value only when only one bit location is set at logic "1" in the shift register SR. This bit location corresponds, as per definition, to the synchronizing bit SB.

When the search counter SZ is synchronous, i.e. when a pulse which is synchronous to the synchronizing bit SB is emitted from its carry output TC, the further counter Z2 counts forwards. Thus, in this case a rising flank occurs at the clock input of the D flip-flop F4 and, in synchronism therewith, the logic "1" of the synchronizing bit SB occurs at its input D. The inverting output $\overline{Q}$ of the D flip-flop F4 in each case emits a logic "0" to the reset input R of the further counter Z2 so that the latter counts forwards. After, for example, 16 pulses at the carry output TC of the search counter SZ, the carry output TC of the further counter Z2 emits a logic "1" to the set input S of the second RS flip-flop F2 whereby its output Q is set at logic "1". Here, it will be assumed that when simultaneously logic ones occur at the set input S from the carry output TC of the further counter Z2 and at the reset input R of the second RS flip-flop F2 from the output Q of the D flip-flop F4, the output Q of the second RS flip-flop F2 is set at logic "1". With the next pulse at the carry output TC of the search counter SZ, the output Q of the second RS flip-flop is then set at logic "0".

In this case, logic ones occur at the inputs of the fifth AND-gate AD5, on the one hand from the output Q of the second RS flip-flop F2 and on the other hand from the minimum carry output TCO of the weighting counter GZ. This weighting counter GZ still has a count of zero since its counting direction input ZE still exhibits a logic "0" which derives from the logic "0" of the synchronizing signal SS emitted from the carry output TC of the working counter AZ. Logic "0" at the counting direction input ZE of the weighting counter GZ causes this counter to count downwards. However, as already mentioned, the count cannot fall below the value of zero.

In this case a logic "1" occurs at the reset input R of the first RS flip-flop F1 and is emitted from its inverting output $\overline{Q}$ to the other input of the third AND-gate AD3.

This causes the count of the search counter SZ to be transferred to the working counter AZ. Expressed in other words, from the carry output TC of the search counter SZ the working counter AZ is set at zero so that the two count upwards in synchronism with one another.

For such time as the synchronizing signal SS, emitted from the carry output TC of the working counter AZ is synchronous to the synchronizing bit SB in the data flow DS, the fourth AND-gate AD4 emits a logic "1" to the counting direction input ZE of the weighting counter GZ. This causes the count of the weighting counter GZ to be increased by, for example, three with each rising flank of the data clock signal DT. At the same time, the synchronizing signal SS occurring at the other inverting input of the first AND-gate AD1 prevents the synchronizing bit SB in the data flow DS from reaching the input E of the shift register SR any longer.

Thus, for such time as the synchronizing signal SS emitted from the carry output TC of the working counter AZ is synchronous to the synchronizing bit SB in the data flow DS, the count of the weighting counter GZ is increased to its maximum value. When the count has assumed, for example, the value of 16, a logic "1" is fed from the maximum carry output TC16 of the weighting counter GZ to the set input S of the first RS flip-flop F1, whereupon the latter emits a logic "0" from its inverting output $\overline{Q}$ to the other input of the third AND-gate AD3. As a result, the connection between the carry output TC of the search counter SZ and the reset input R of the working counter AZ is cut off.

Up to the maximum count of the weighting counter GZ, the search counter SZ and the working counter AZ are connected via the third AND-gate AD3. Since the synchronizing signal SS gates out the synchronizing bit SB in the data flow DS, following the first emission of the synchronizing signal SS, only logic zeros pass through the shift register SR. As will be explained later, the shift register SR is then filled with the bits of the data flow DS, still without the synchronizing bit SB. In both cases, in which logic zeros or the bits of the data flow DS pass through the shift register SR, the working counter AZ emits the synchronizing signal SS unchanged.

Only in the event that the search counter SZ finds a "different" synchronizing bit SB and the weighting counter GZ has not yet reached its maximum count is the working counter AZ synchronized to the "new" synchronizing bit SB. The weighting counter GZ does not reach its maximum count when the "old" synchronizing bit SB was not a synchronizing bit SB or is adulterated over a long period of time. In this case, a logic "0" is applied via the fourth AND-gate AD4 to the counting direction input ZE of the weighting counter ZG, whereupon the latter reduces its count, for example by one, with each flank of the data clock signal DT.

As already described, the synchronizing signal SS, which is emitted from the working counter AZ, gates out the synchronizing bit SB in the data flow DS for the input E of the shift register SR. Therefore, only logic zeros pass through the bit locations of the shift register SR. The counter Z1 is no longer reset via its reset input R by the logic zeros emitted from the output A of the shift register SR. The maximum count of the counter Z1 corresponds to the number of bit locations in the shift register SR and thus varies between 68 and 1080. When it has reached its maximum count, the counter Z1 emits a logic "1" from its carry output TC to the set input S of the third RS flip-flop F3, as a result of which the RS flip-flop emits a logic "1" from its output Q, via the OR-gate OD, to the other input of the second AND-gate AD2. This logic "1" causes the bits of the data flow DS to be re-input into the shift register SR. As already described, within a frame only the synchronizing bit SB is not transferred to the input of the shift register SR. As soon as the first logic "1" of the data flow DS is emitted from the output A of the shift register SR, to the reset input R of the third RS flip-flop FS, the output Q of the said RS flip-flop is again set at logic "0" so that the same procedure takes place as described at the start of the initial synchronization. Here, it should again be noted that the search counter SZ can no longer be reset by the synchronizing bit SB in the data flow DS, for which the working counter AZ emits its synchronous synchronizing signal SS.

Commencing from a state of synchronism, two fundamentally different situations can occur.

In a first situation, the synchronizing bit SB in the data flow DS is adulterated. This causes the fourth AND-gate AD4 to emit a logic "0" to the counting direction input ZE of the weighting counter GZ as, in synchonism with the synchronizing signal SS, the adulterated synchronizing bit SB, i.e. a logic "0", occurs at the first input of the fourth AND-gate AD4. The logic "0" at the counting direction input ZE of the weighting counter GZ causes the count thereof to be reduced by, for example, one with each rising flank of the data clock signal DT. If the synchronizing bit SB in the data flow DS is continuously adulterated, the count of the weighting counter GZ reaches the value of zero, i.e. a logic "1" is emitted from its minimum carry output TCO. In this case, this logic "1", and likewise the logic "0" emitted from the output Q of the second RS flip-flop F2, occur at the inputs of the fifth AND-gate AD5. This means that the first RS flip-flop F1 is not reset and working counter AZ continues to emit the previous synchronizing signal SS.

In a second situation, it will be assumed that, for example, as a result of bit slippage, the synchronizing bit SB in the data flow DS has changed its position relative to the synchronizing signal SS. The synchronizing signal SS emitted from the carry output TC of the working counter AZ is no longer synchronous with the synchronizing bit SB and therefore a logic "0" is emitted from the fourth AND-gate AD4 to the counting direction input ZE of the weighting counter GZ. As already described in the first situation, after some time a logic "1" is emitted from the minimum carry output TCO of the weighting counter GZ to the first input of the fifth AND-gate AD5.

As already described in respect of the initial synchronizing, in this case also, after some time the search counter SZ is synchronized to the "new" synchronizing bit SB. When sixteen pulses which are synchronous to the synchronizing bit SB have been emitted from the carry output TC of the search counter SZ, as in the case of the initial synchronization the output Q of the second RS flip-flop F2 is set at logic "1" via the carry output TC of the further counter Z2. In this case logic ones occur at the two inputs of the fifth AND-gate AD5, so that the inverting output $\overline{Q}$ of the first RS flip-flop F1 is set at logic "1" and thus, the count of the search oounter SZ is transferred to the working counter AZ.

Thus, whenever the working counter AZ emits a synchronizing signal SS, the following two criteria must be fulfilled for resynchronization. Firstly, it must be established over a plurality of frame lengths that the synchronizing signal SS of the working counter AZ is not synchronous to the synchronizing bit SB in the data flow DS, and secondly, the search counter SZ must emit a pulse which is synchronous to be "new" synchronizing bit SB at its carry output TC over a plurality of frame lengths.

Together with the OR-gate OD, the counter Z1 and the third RS flip-flop F3 ensure that when a synchronizing signal SS is emitted from the working counter AZ which is synchronous with the synchronizing bit SB—in this case only logic zeros pass through the shift register SR—said shift register is loaded with new bits of the data flow DS for a period of one frame length.

As a result of the integrated influence of the weighting counter GZ, the predominant coincidence of the synchronizing signal SS with the synchronizing bit SB in comparison to a stochastic signal is evaluated, and in this way continuous resynchronization in the event of periodic adulteration of the synchronizing bit SB is avoided. The count increase of three, and the count reduction of one, of the weighting counter GZ is empirically determined and is dependent upon disturbances and factors relating to the transmission path.

Instead of the one synchronizing bit SB, it is also possible to use an item of synchronizing information consisting of a plurality of bits in the method corresponding to the invention. In this case, for example, the OR-gate OD is followed by a further shift register (not shown here). The parallel outputs of this shift register are connected via a logic-linking device to the reset input R of the search counter SZ. For such time as the synchronizing information is not contained in the further shift register once in respect of each frame, the search counter SZ does not reach its predetermined, maximum count.

It will be apparent that various modifications or additions may be made in the apparatus and method of the present invention without departing from the essential features of novelty thereof, which are intended to be defined and secured by the appended claims.

What is claimed is:

1. A method of frame decoding, in a multiplexer-demultiplexer system for digital signal transmission in which a series data flow (DS) has a frame structure including an item of periodically occurring synchronizing information which characterizes the start of each frame, comprising the steps of
synchronizing a frame recognition circuit (SZ) to the periodically occurring item of synchronizing information, in which one single synchronizing bit (SB) is used as said synchronizing information,
following a predetermined number of correctly recognized items of synchronizing information, coupling a frame generator (AZ) to said frame recognition circuit,
determining in each successive frame coincidence between a synchronizing signal (SS) which is emitted from the frame generator and the item of synchronizing information, to establish that synchronous coincidence is maintained,
increasing the count of a weighting counter (GZ) by a predetermined quantity, periodically, in the case of synchronous coincidence, up to a maximum count, and reducing the count of said weighting counter by a predetermined quantity, periodically, in the case of non-coincidence, down to a minimum count,
decoupling said frame generator from said frame recognition circuit, when the maximum count of the weighting counter (GZ) is reached,
checking said data flow for a further item of synchronizing information in each frame and gating out each item of synchronizing information contained in the frame generator,
performing resynchronization of the frame generator to the frame recognition circuit only when the count of the weighting counter (GZ) has reached its minimum count and the frame recognition circuit has correctly recognized a predetermined number of items of synchronizing information,
supplying said data flow (DS) to the input of a shift register (SR),
tapping an output (A) of said shift register (SR) which occupies a specific bit position within the frame,
logic-linking data at the said tappped output via an AND-gate (AD2) with a bit of the data flow (DS) which occupies the same bit position,
supplying the logic-link result to an input (E) of the shift register (SR), whereby, after a plurality of frame lengths only the synchronizing bit (SB) passes through the shift register (SR),
said search counter (SZ), having a maximum count corresponding to the number of bits in the frame,
resetting said search counter by supplying thereto logic ones emitted from the output A of the shift register (SR) whereby, when only one bit corresponding to the synchronizing bits (SB) is set at logic "1" in the shift register (SR), a pulse which is synchronous to said synchronizing bit (SB) is emitted from the carry output (TC) of the search counter (SZ).

2. The method as claimed in claim 1, including the step of increasing, selectively, the count of the weighting counter (GZ) by one for each frame and reducing said count by three for each frame.

3. Apparatus for decoding frames in a multiplexer-demultiplexer system for digital transmission, with a series data flow (DS) having a frame structure including an item of periodically occurring synchronizing information which characterizes the start of each frame, comprising, in combination,
a frame recognition circuit connected to receive said data flow, and including means for counting the number of frames containing recognized items of synchronizing information and for indicating when a predetermined number of items of synchronizing information have been recognized,
working counter means and means connected between said frame recognition circuit and said working counter means for coupling said frame recognition circuit to said working counter means when said predetermined number of items of synchronizing information have been recognized,
coincidence means connected to said working counter and to said data flow for producing a signal indicating the existance of synchronous operation,
weighting counter means connected to said coincidence means and adapted to periodically increase its count by a predetermined quantity up to but not in excess of a maximum quantity when the output of said coincidence means has one value and to periodically reduce its count by a predetermined quantity down to but not below a predetermined quantity when the output of said coincidence means has a different value, means for decoupling said working counter means from said frame recognition circuit when said working counter is at said maximum count, means for coupling said working counter means to said frame recognition circuit when said working counter is at said minimum value, means for indicating the recognition of a further item of synchronizing information in a frame and disabling said frame recognition circuit in response thereto, whereby said working counter is operative to produce a synchronizing pulse for resynchronizing said working counter with said frame recognition circuit only when the count of said weighting counter has reached its minimum count and said frame recognition circuit has correctly recognized a predetermined number of items of synchronizing information, said recognition circuit including an AND-gate connected to receive said data flow and a shift register having its input connected to said AND-gate, and means for connecting a second input of said AND-gate to a tap of said shift register, whereby the output of said shift register at said tap indicates the state of bits of said data flow which do not change in value between successive frames.

* * * * *